US010007369B1

(12) United States Patent
Noh

(10) Patent No.: US 10,007,369 B1
(45) Date of Patent: Jun. 26, 2018

(54) TECHNIQUES FOR ASSEMBLING A MULTI-LAYERED DISPLAY SCREEN

(71) Applicant: Amazon Technologies, Inc., Seattle, WA (US)

(72) Inventor: Sukwon Noh, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 565 days.

(21) Appl. No.: 13/781,419

(22) Filed: Feb. 28, 2013

(51) Int. Cl.
G06F 3/041 (2006.01)
B29C 65/48 (2006.01)

(52) U.S. Cl.
CPC ............ *G06F 3/0412* (2013.01); *B29C 65/48* (2013.01)

(58) Field of Classification Search
CPC ......... G02F 1/133608; G02F 1/133308; B29C 65/48
USPC .................................... 345/173–174; 349/58
See application file for complete search history.

(56) References Cited

U.S. PATENT DOCUMENTS

| 9,041,686 | B2 * | 5/2015 | Zehner | G06F 3/044 345/174 |
| 9,383,768 | B1 * | 7/2016 | Menon | G06F 1/1656 |
| 9,423,830 | B1 * | 8/2016 | Wei | B29D 11/00663 |
| 9,778,696 | B1 * | 10/2017 | Menon | G06F 1/1637 |
| 9,811,188 | B1 * | 11/2017 | Subbarayan | G06F 3/0412 |
| 2004/0114067 | A1 * | 6/2004 | Kubomura | G02B 6/0065 349/62 |
| 2006/0098185 | A1 * | 5/2006 | Byun | G03F 7/2014 355/75 |
| 2006/0139748 | A1 * | 6/2006 | Ahn | G02F 1/167 359/396 |
| 2011/0194037 | A1 * | 8/2011 | Hirabayashi | G02F 1/133308 349/5 |
| 2011/0235364 | A1 * | 9/2011 | Lo | G02F 1/133308 362/611 |
| 2014/0062939 | A1 * | 3/2014 | Zehner | G06F 3/044 345/174 |

FOREIGN PATENT DOCUMENTS

JP 2000147469 A * 5/2000

* cited by examiner

*Primary Examiner* — Sophie Hon
(74) *Attorney, Agent, or Firm* — Lee & Hayes, PLLC

(57) ABSTRACT

Embodiments of an electronic device with an assembled multi-layered display screen and methods for a multi-layered screen assembly are disclosed herein. In one instance, the method may include disposing a frame for a display screen upon a base comprising a substantially flat surface and substantially corresponding to a shape of the display screen, assembling the display screen by stacking multiple components within the frame such that the assembled display screen faces the base, and delivering a bonding substance into the frame such that the bonding substance substantially fills the frame to the depth of the frame and around the stacked multiple components. The substance may be allowed to harden to a solid state thus bonding the assembly. The frame may have a depth substantially corresponding to a thickness of the assembled display screen. Other embodiments may be described and/or claimed.

20 Claims, 6 Drawing Sheets

TECHNIQUES FOR ASSEMBLING A MULTI-LAYERED DISPLAY SCREEN

BACKGROUND

As the use of electronic devices with multi-layer, such as touch-sensitive, display screens continues to expand, so do techniques for manufacturing such displays. A multi-layer display screen of an electronic device may be assembled by stacking multiple layers to form the screen (e.g., anti-glare film, a light guide, an electronic ink, or the like) such that the stacked layers are bonded together. The layers may be bonded together, for example, by a repeated lamination process involving adhesive substrates, such as optical clear adhesives (OCA), inserted between the adjacent layers that form the assembled screen.

However, the prior art techniques for manufacturing multi-layer display screens have a number of shortcomings. For example, using multiple adhesive layers for lamination may result in a substantial increase of a screen thickness and corresponding decrease of rendering properties, such as a yield rate. Furthermore, lamination may be a repeated process of bonding adjacent layers one by one with adhesives. Accordingly, the display screen assembly may take a long time, require substantial resources, and incur substantial costs. Furthermore, repairing an assembled display screen produced by repeated lamination may prove to be difficult, if not impossible.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Techniques described herein provide for manufacturing multi-layered display screens for displays that may be used with various electronic devices. A multi-layered display screen may be assembled by stacking the layers of the screen (e.g., screen components) upon each other and disposing the stack within a screen frame configured to surround the screen. A bonding substance may be delivered into the frame around the stack of the screen components. The bonding substance may be caused, or allowed to, harden into a solid state, thereby bonding the screen components within the frame.

More specifically, in some embodiments, a display screen frame may be provided that may substantially correspond with a desired shape and dimensions of the display screen. The frame may be produced of a transparent material that may be adapted for allowing an ultraviolet (UV) light through. The frame may have a depth dimension that may substantially correspond to a thickness of the display screen, when assembled.

The frame may be disposed upon a base. The base may be a fixture that may include a substantially flat surface and may be removed after the screen assembly has been completed. The screen components may be stacked in a desired order (e.g., so as to form the display screen facing the base) within the frame such that there may be empty spaces between the stack and the frame sides. A bonding substance (e.g., a UV resin) may be delivered into the frame so as to substantially fill the empty space between the frame and the stacked screen components. For example, the bonding substance may fill the frame to the depth of the frame and around the stacked components. The bonding substance may be allowed to harden into a transparent solid state (e.g., by leaving the substance to harden for a period of time), thereby bonding the stacked multiple components within the frame. In another example, the bonding substance may be caused to harden by curing the substance with UV light or cooling the substance for a period of time.

Figure 1:
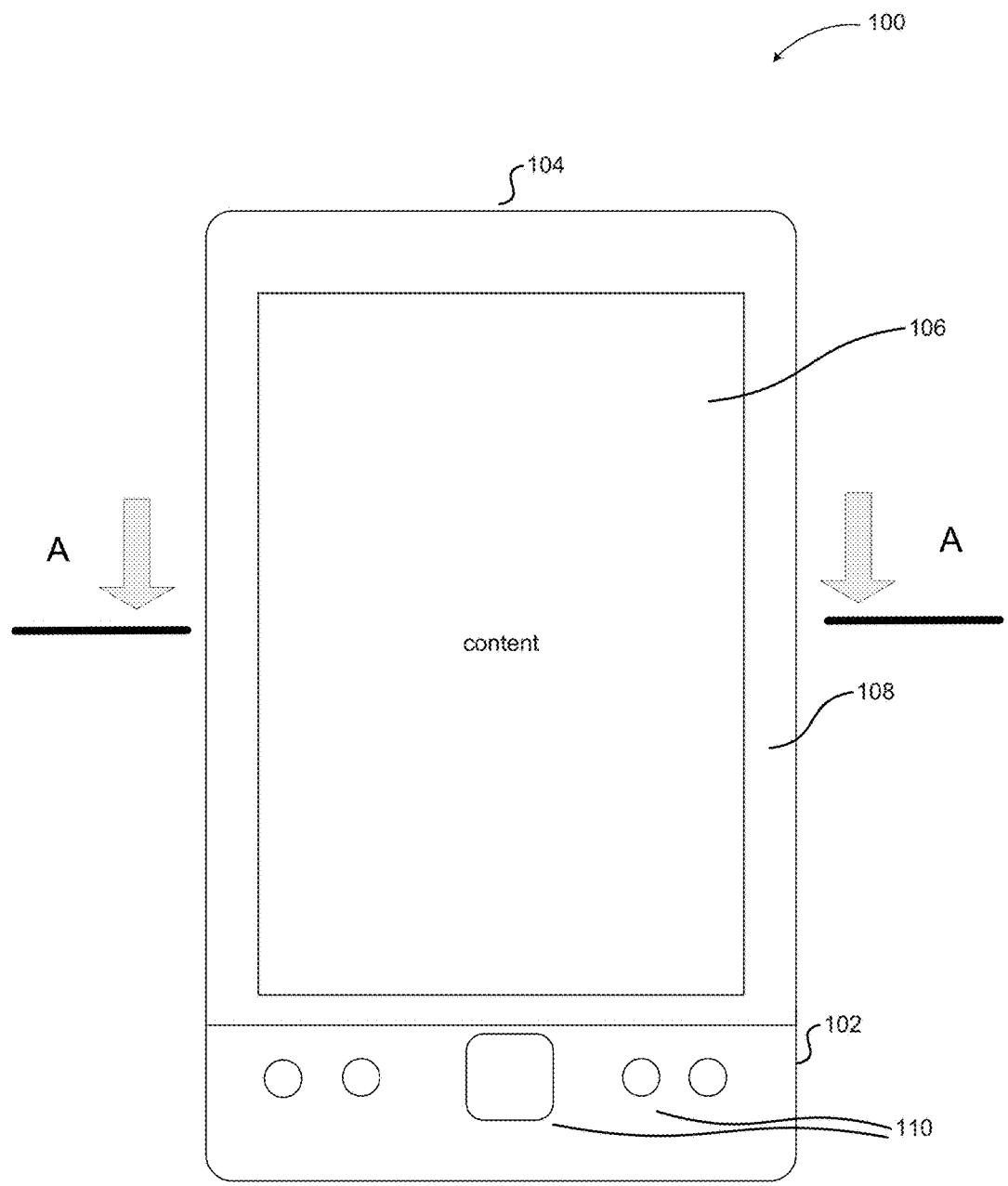
FIG. 1 is a diagram illustrating a front view of an example computing device with a display screen in accordance with various embodiments.

FIG. 1 is a diagram illustrating an example electronic device 100. For purposes of illustration, the electronic device 100 shown in FIG. 1 is an electronic reader. However, the electronic device configured as described herein may not be limited to the example illustrated in FIG. 1, but may include a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the electronic device 100 may be any other electronic device that processes data and renders the data for display. In general, the example electronic device 100 may include any electronic device having a multi-layered display screen configured to display electronic content and/or provide interactive capabilities such as touch sensitivity.

Figure 2:
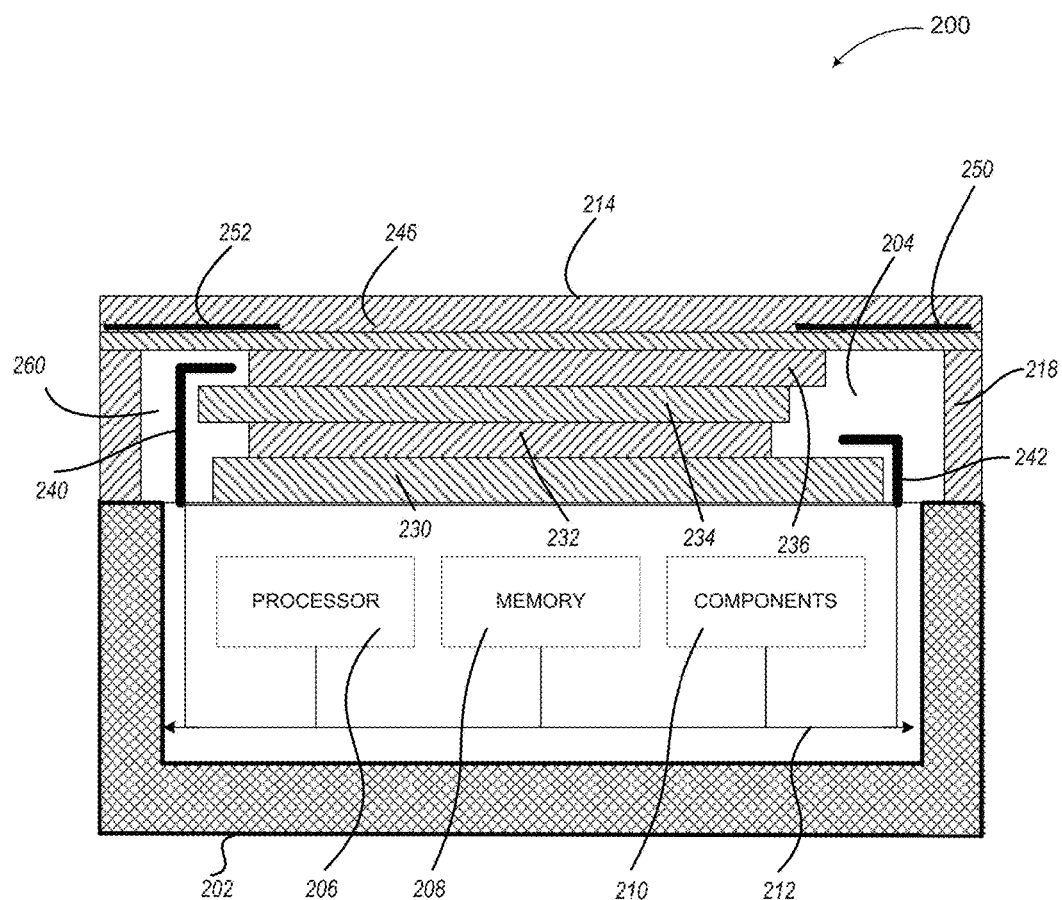
FIG. 2 is a diagram illustrating a cross-section of an example computing device with schematic illustration of electronic in accordance with various embodiments.

The electronic device 100 may include housing 102 configured to host the electronic device components (not shown). The electronic device 100 may further include a display 104 having a screen 106 disposed within a display frame 108. The electronic device may include controls 110 configured to receive user input. In one example, the screen 106 may be configured to provide touch sensitive capabilities, such as receiving, and responding to, touch input from a user. The device components (not shown) may include a processor and a memory, in communication with a variety of other components. These other components may include, by way of example, a network interface, an input device interface, and a display interface, and will be described in greater detail in reference to FIG. 2 illustrating a cross-section view A of the electronic device 100. As appreciated by those skilled in the art, the described components may enable the electronic device 100 to communicate data, control signals, data requests, and other information with other resources including computers, data sources, storage devices, and the like, on a computer network such as the Internet (not shown). In embodiments, screen 106 is formed in accordance with teachings of the disclosure, to be described more fully below with references to the remaining figures.

FIG. 2 is a schematic illustration of a cross-section A of the example electronic device 100. The illustrated cross-section includes a housing 202 configured to house the device electronic components and a display 204. Some of the device components are shown schematically within the housing; however, it should be understood that the components are shown for illustrative purposes only. Many different electronic components may comprise an electronic device configured for particular purposes, be it a smartphone, an electronic reader, a tablet computer, a laptop, or the like. The illustrated components may include a processor 206, a memory 208, and other components 210 necessary for a particular configuration of the electronic device 100. The components may be connected and configured to communicate over a device bus 212.

The components 210 may include, for example, an input device interface, sometimes also embodied as an input/output interface, that may enable the electronic device 100 to obtain data input from a variety of devices including, but not limited to, a digital pen, a touch screen, a keyboard, a mouse, a scanner, and the like. The components 210 may further include a display interface configured to output display information on the display 204 via the multi-layered screen 214, such as a monitor, a liquid crystal display (LCD) screen, an integrated screen or sets of screens, and the like. As shown, the display 204 may be incorporated as an integral element within the electronic device 100.

The processor 206 may be configured to operate in accordance with programming instructions stored in a memory 208. The memory 208 may generally comprise RAM, ROM, and/or other non-volatile memory. The memory 208 may store an operating system for controlling the general operation of the electronic device 100. The operating system may be a general purpose operating system such as a Microsoft Windows® operating system, a UNIX® operating system, a Linux® operating system, or an operating system specifically written for and tailored to the electronic device 100. The memory 208 may also store user-executable applications, or programs, for conducting various functions on the electronic device 100.

The display 204 may include a display screen 214 disposed within a frame 218 as briefly described in reference to FIG. 1. In some embodiments, the screen 214 may be a multi-layered screen having a number of components, such as layers or substrates stacked upon each other such that the adjacent layers remain in a permanent contact. The screen components may include various active components configured to enable touch-sensitivity and other capabilities of the display 204. For example, the illustrated components may include electronic paper layers 230 and 232, such as electrophoretic ink (E Ink), capacitive sensor glass 234, front light guide 236, flexible printed circuit boards (FPCB) 240 and 242, and other components that may be included in the multi-layered screen as necessary.

For example, an anti-glare film 246 may be disposed on top of screen via an adhesive substrate (e.g., OCA) 250. Black printing layer 252 may be disposed between the anti-glare film 246 and the adhesive substrate 250. The stacked components 230, 232, 234, 236, 240 and 242 may be bonded together with a bonding substance 260 filling the space between the stacked components 230, 232, 234, 236, 240 and 242 and the frame 218. In embodiments, display screen 214 of the display 204 may be assembled in accordance with teachings of the disclosure, to be described in greater detail in reference to FIGS. 3-6.

Figure 3:
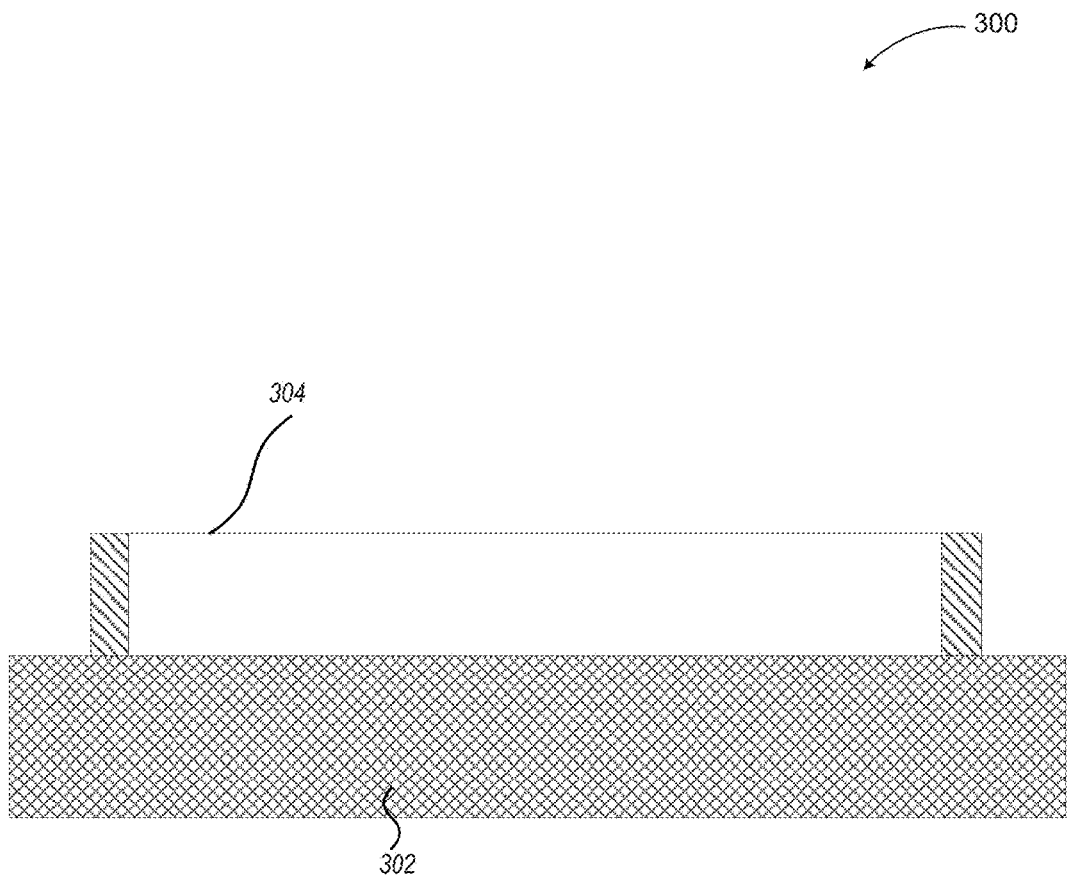
FIG. 3 is a diagram illustrating a stage of disposing an example frame on a base in accordance with various embodiments.

FIG. 3 illustrates a first stage of the multi-layered display screen assembly process, in accordance with some embodiments. More specifically, FIG. 3 illustrates a cross-sectional view 300 of a display frame 302 and a base 304 that are employed at the first stage of the display screen assembly process. As shown, the display frame 302 may be disposed on the base 304. As briefly described above, the display frame 302 may substantially correspond to a shape and dimensions of the display screen. The display frame 302 may have a thickness dimension substantially corresponding to an expected thickness of the multi-layered display screen that includes a stack of screen components to be disposed within the frame as described in reference to FIG. 4 in detail.

The base 304 may comprise a fixture that may include a substantially flat surface on which the frame 302 may be disposed. The base 304 may be removed after the screen assembly described herein has been completed. In some embodiments, the base 304 may be configured to be transparent (e.g., the base 304 may include a UV mold base) so as to allow UV light through in order to cure a bonding substance applied to the screen assembly as described below in greater detail. For similar purposes, the display frame 302 may be also configured to be substantially transparent, in some embodiments.

Figure 4:
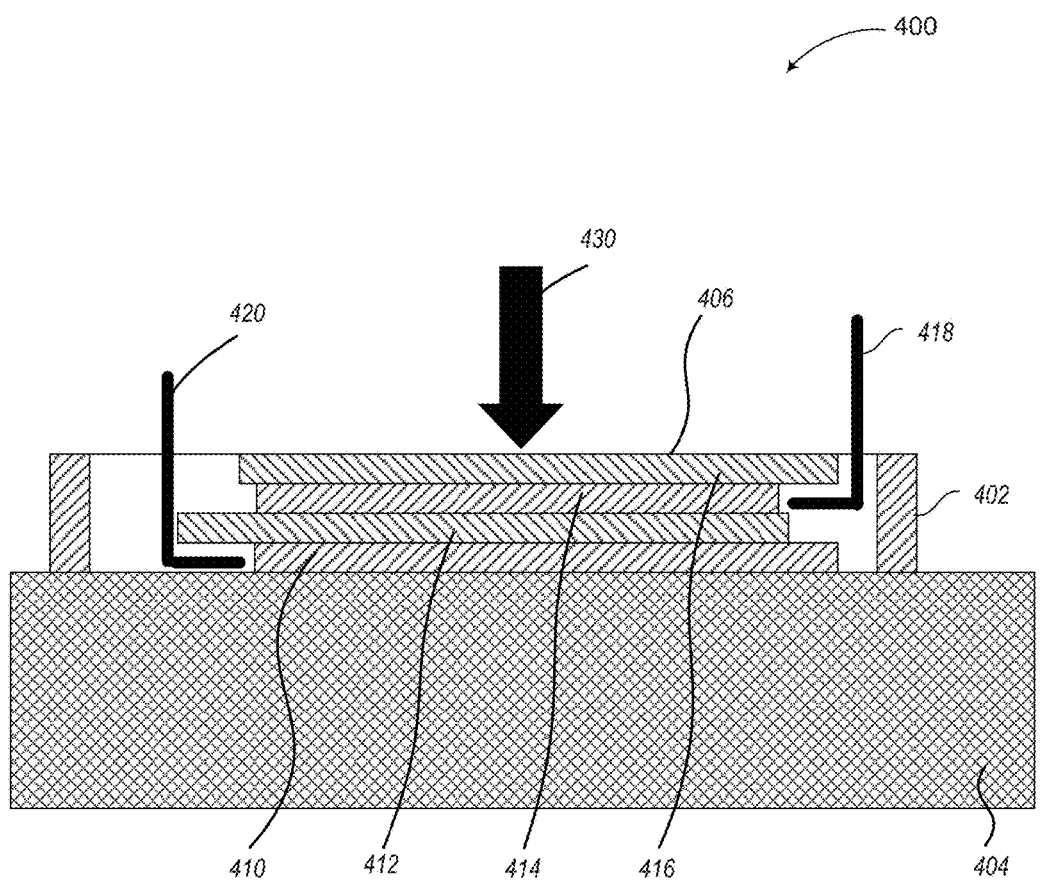
FIG. 4 is a diagram illustrating a stage of stacking the screen components in the example frame in accordance with various embodiments.

FIG. 4 illustrates a second stage of the multi-layered display screen assembly process, in accordance with some embodiments. More specifically, FIG. 4 illustrates a cross-sectional view 400 of a display frame 402 disposed on a base 404 and a stack 406 of screen components that are disposed within the frame 402. In some embodiments, the screen components 410, 412, 414, 416, 418, and 420 may be disposed one by one within the frame 402 as shown by arrow 430 so as to form the stack 406. The stacking may be accomplished in a clean environment (e.g., a clean room) in order to ensure a cleanness of the assembled display screen.

A positioning system may be employed to stack the screen components 410, 412, 414, 416, 418, and 420. As briefly discussed above, the screen components 410, 412, 414, 416, 418, and 420 may be stacked in a certain order that may define the desired properties of the display screen 204. In one example, the screen components 410, 412, 414, 416, 418, and 420 may include a front light guide, a capacitive sensor glass, E Ink layers, and FPCB respectively. As shown, the screen components may be offset from each other and/or have different dimensions, e.g., thickness, length, and width, and may be positioned within the frame so as to allow for an empty space between the frame sides and the screen components.

Figure 5:
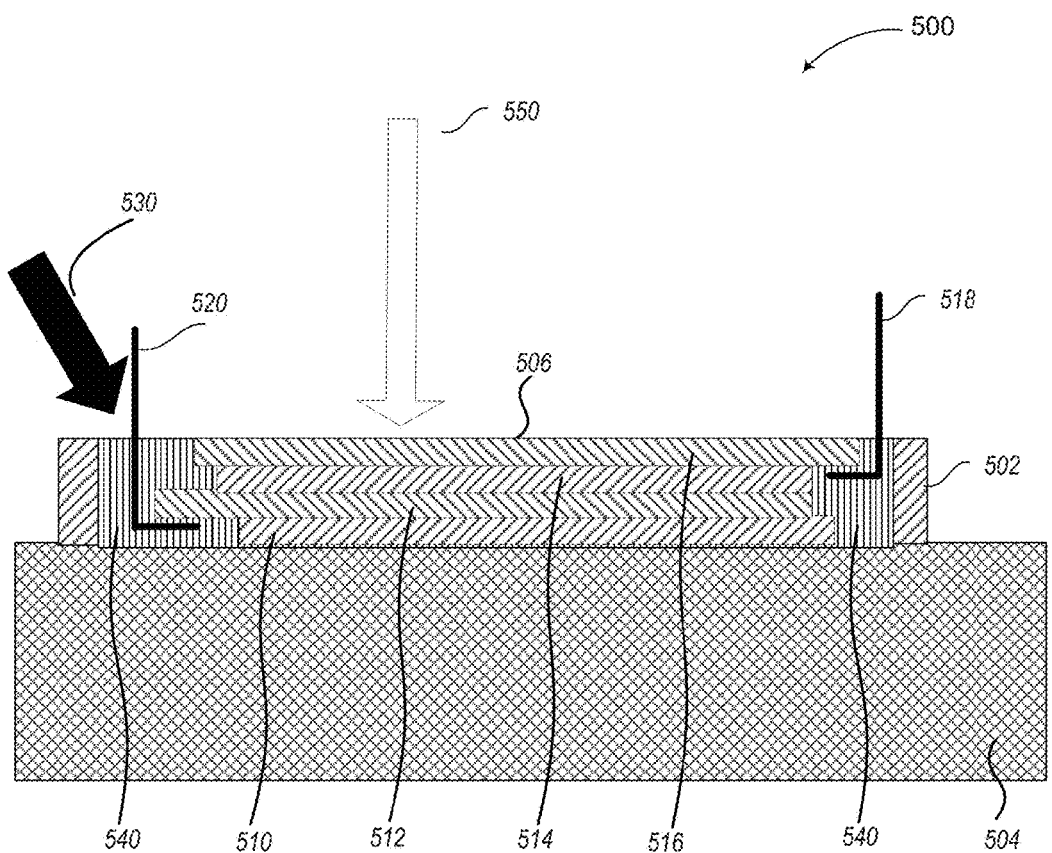
FIG. 5 is a diagram illustrating a stage of delivering a bonding substance into the example frame around the stack in accordance with various embodiments.

FIG. 5 illustrates a third stage of the multi-layered display screen assembly process, in accordance with some embodiments. More specifically, FIG. 5 illustrates a cross-sectional view 500 of a display frame 502 disposed on a base 504 and a stack 506 of screen components 510, 512, 514, 516, 518, and 520 that are disposed within the frame 502 as described above in reference to FIG. 4. In one example, the screen components 510, 512, 514, 516, 518, and 520 may include a front light guide, a capacitive sensor glass, E Ink layers, and FPCB respectively.

At the third stage, a bonding substance may be delivered 530 into the frame 502, so as to fill the spaces between the stack 506 and the walls of the frame 502. The bonding substance, when delivered, may spread around the stack as indicated by the numeral 540. In one example, the bonding substance may substantially fill the frame 502 to its depth. In some embodiments, when delivering the bonding substance, it may be beneficial to apply pressure 550 to the stack 506 so as to have the components 510, 512, 514, 516, 518, and 520 maintain a permanent physical contact with each other and with the surface of the base 504. The pressure 550 may be applied to the stack 506 in order to substantially prevent the bonding substance 540 from getting between (e.g., seeping or oozing through) the components or between the component 510 facing the base 502, and the base 502.

The delivery of the bonding substance 540 may be accomplished in a number of different ways, such as by compressing, molding, injecting, poring, and the like. The bonding substance may include different types of liquid characterized with an ability to harden into a solid state. In some embodiments, the bonding substance, when hardened into a solid state, may be transparent in order to provide desired transparency properties to the display screen 204. In some instances, the bonding substance may include one of ultraviolet (UV)-curable resin, epoxy, an UV-curable glue, or other substance with similar properties.

Figure 6:
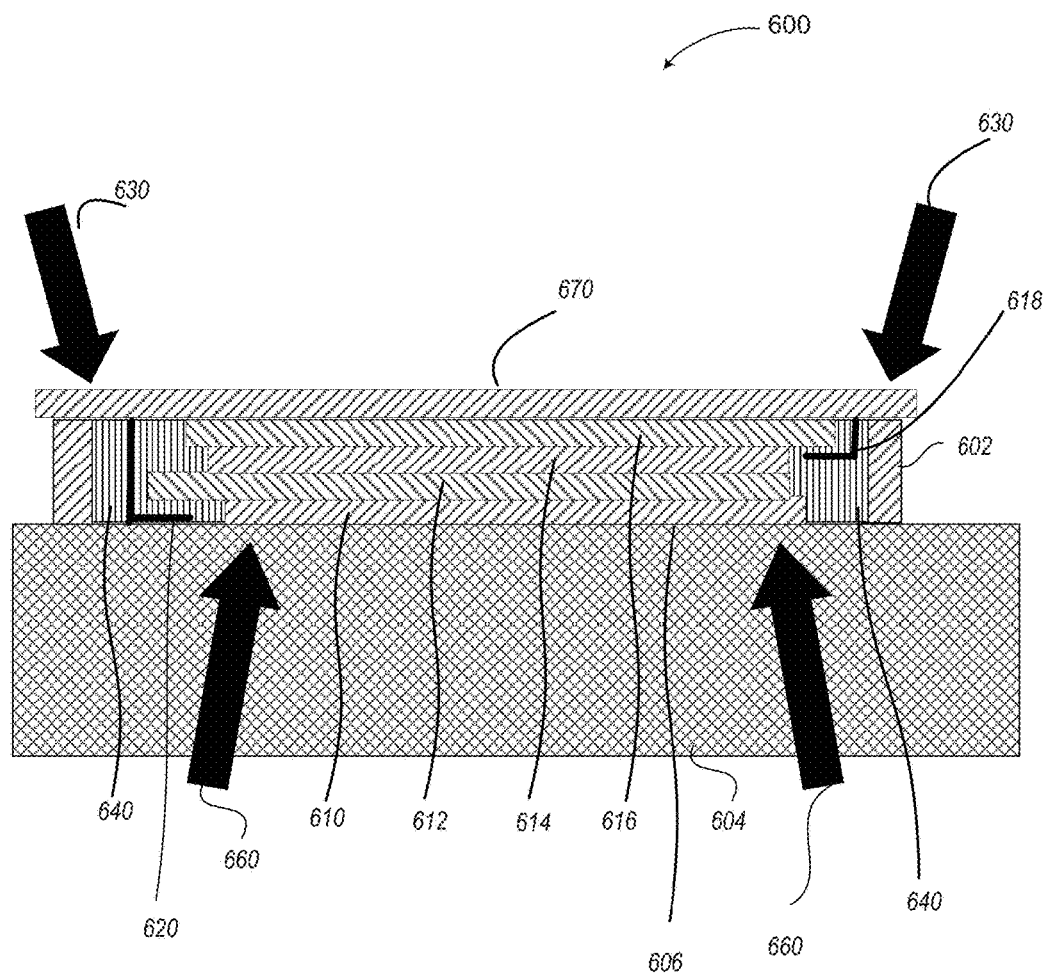
FIG. 6 is a diagram illustrating a stage of curing the bonding substance with ultraviolet light in accordance with various embodiments.

FIG. 6 illustrates a fourth stage of the multi-layered display screen assembly process, in accordance with some embodiments. More specifically, FIG. 6 illustrates a cross-sectional view 600 of a display frame 602 disposed on a base 604 and a stack 606 of screen components 610, 612, 614, 616, 618, and 620 that are disposed within the frame 602 as described above in reference to FIGS. 4-6. In one example, the screen components 610, 612, 614, 616, 618, and 620 may include a front light guide, a capacitive sensor glass, E Ink layers, and FPCB respectively. At the fourth stage, a bonding substance 640 delivered into the frame 602 as described in reference to FIG. 5, may be caused or allowed to harden into a solid state, in one example, into a transparent solid state. Causing the bonding substance 640 to harden into a solid transparent state may be accomplished, in some embodiments, by curing the bonding substance 640 with UV light 630 directed at the screen.

In one example, UV light 630 may be directed from the top down at the assembly comprising the frame 602, the stack 606, and the bonding substance 640. In another example, UV light 660 may be directed from bottom and/or sides of the base 604. In yet another example, UV light 630 and 660 may be directed at the assembly from top and bottom. In some embodiments, in order to allow for UV light to penetrate through and reach the bonding substance 640 for curing, the base 604 and the frame 602 may be made substantially transparent. In yet another example, an additional fixture comprising a transparent lid 670 may be disposed on top of the assembly in order to better facilitate the curing of the bonding substance 640 with the UV light 630. The lid 670 may be removed after the curing of the bonding substance 640 has been completed.

In some embodiments, the bonding substance 640 delivered into the frame 602 may be caused to harden into a solid state by cooling. In some embodiments, the bonding substance 640 delivered into the frame 602 may be allowed to harden into a solid state by leaving the assembly to harden for a period of time. The complete assembly of the multi-layer screen may involve some additional steps. For example, an anti-glare film component may be added to the top of the screen assembly. The anti-glare film component (not shown) may be laminated to the screen with a laminate layer (e.g., OCA) after the base 602 has been removed. The anti-glare film may be pre-printed with a black border masking in order to provide a bezel for the screen. In some embodiments, the bezel may be software-implemented, e.g., the borders of the screen may be programmed to have a darker shade than the rest of the surface of the screen.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A display screen, comprising:
    a frame substantially defining a shape of the display screen, the frame including substantially planar internal sides, a first top surface, and a first bottom surface opposite the first top surface, the frame having a depth extending from the first top surface to the first bottom surface;
    a plurality of components stacked upon one another and disposed within the frame, wherein the plurality of components includes:
        a second top surface,
        a second bottom surface opposite the second top surface,
        a thickness extending from the second top surface to the second bottom surface, the thickness being substantially equal to the depth of the frame,
        a light guide positioned such that a third top surface of the light guide extends substantially coplanar with the first top surface,
        a capacitive sensor glass configured to sense a touch input, the capacitive sensor glass having a first side facing the second top surface and extending along the light guide, and a second side opposite the first side,
        a first electrophoretic ink layer extending along the second side of the capacitive sensor glass, and
        a second electrophoretic ink layer extending along the first electrophoretic ink layer; and
    a bonding substance surrounding the plurality of components within the frame, the bonding substance extending from the first bottom surface to the first top surface.

2. The display screen of claim 1, wherein each component of the plurality of components defines a transparent substrate.

3. The display screen of claim 1, wherein the bonding substance substantially fills the frame and bonds the plurality of components within the frame, the bonding substance being configured to be hardened into a transparent solid state by curing with an ultraviolet (UV) light, the plurality of components being positioned such that there is substantially no bonding substance in between individual components of the plurality of components.

4. The display screen of claim 3, wherein the frame is configured to be transparent so as to allow the UV light to penetrate through the frame.

5. The display screen of claim 1, wherein
    the second electrophoretic ink layer is positioned such that a third bottom surface of the second electrophoretic ink layer extends substantially coplanar with the first bottom surface.

6. The display screen of claim 1, wherein the stack of the plurality of components further includes at least one flexible printed circuit board.

7. The display screen of claim 1, wherein at least one component of the stack of the plurality of components is laterally offset in the frame from at least one other component of the stack of the plurality of components within the stack, such that the bonding substance contacts offset surfaces of the stack of the plurality of components.

8. An electronic device, comprising:
a display, including:
a frame substantially defining a shape of the display, the frame including substantially planar internal sides, a first top surface, and a first bottom surface opposite the first top surface, the frame having a depth extending from the first top surface to the first bottom surface;
a display screen comprising a plurality of components stacked upon one another and disposed within the frame, wherein the plurality of components includes:
a second top surface,
a second bottom surface opposite the second top surface,
a thickness extending from the second top surface to the second bottom surface, the thickness being substantially equal to the depth of the frame,
a light guide positioned such that a third top surface of the light guide extends substantially coplanar with the first top surface,
a capacitive sensor glass configured to sense a touch input, the capacitive sensor glass having a first side facing the second top surface and extending along the light guide, and a second side opposite the first side,
a first electrophoretic ink layer extending along the second side of the capacitive sensor glass, and
a second electrophoretic ink layer extending along the first electrophoretic ink layer; and
a bonding substance surrounding the plurality of components within the frame, the bonding substance extending from the first bottom surface to the first top surface;
a processor coupled with the display; and
a memory coupled with the processor, and configured to store instructions, wherein the instructions, in response to execution on the processor, render electronic content on the display.

9. The electronic device of claim 8, wherein the electronic device includes one of a personal computer, a notebook, an ultrabook, a smartphone, an electronic book reader, a laptop computer, a personal digital assistant (PDA), a workstation, or a tablet computer.

10. The electronic device of claim 8, wherein each component of the plurality of components comprises a transparent substrate.

11. The electronic device of claim 8, wherein the plurality of components further include a flexible printed circuit board.

12. The electronic device of claim 8, wherein the frame comprises a transparent material that allows ultraviolet (UV) light to penetrate through the frame.

13. The electronic device of claim 8, wherein the display screen further includes an antiglare film disposed on top of the plurality of components such that the antiglare film substantially covers a surface defined by the frame and the plurality of components disposed within the frame, thereby defining a face of the display screen.

14. The electronic device of claim 8, wherein at least one component of the stack of the plurality of components is laterally offset in the frame from at least one other component of the stack of the plurality of components within the stack, such that the bonding substance contacts offset surfaces of the stack of the plurality of components.

15. A display apparatus, comprising:
a frame substantially defining a shape of the display apparatus, the frame including substantially planar internal sides, a first top surface, and a first bottom surface opposite the first top surface, the frame having a depth extending from the first top surface to the first bottom surface;
a plurality of display components stacked upon one another and disposed within the frame, wherein the plurality of display components includes:
a second top surface,
a second bottom surface opposite the second top surface,
a thickness extending from the second top surface to the second bottom surface, the thickness being substantially equal to the depth of the frame,
a light guide positioned such that a third top surface of the light guide extends substantially coplanar with the first top surface,
a capacitive sensor glass layer having a first side facing the second top surface and extending along the light guide, and a second side opposite the first side,
a first electrophoretic ink layer extending along the second side of the capacitive sensor glass layer, and
a second electrophoretic ink layer extending along the first electrophoretic ink layer,
the plurality of display components being positioned to define a space between at least one of the substantially planar internal sides of the frame and at least one display component of the plurality of display components; and
a bonding substance filling the space between the at least one of the substantially planar internal sides of the frame and the at least one display component of the plurality of display components, wherein the bonding substance extends from the first bottom surface to the first top surface.

16. The display apparatus of claim 15, wherein the display apparatus further includes one or more flexible circuit boards, the one or more flexible circuit boards extending, in the space between the at least one of the substantially planar internal sides of the frame and the at least one display component of the plurality of display components, from proximate the second bottom surface toward the second top surface.

17. The display apparatus of claim 16, wherein the bonding substance fixes the position of the one or more flexible circuit boards in the space.

18. The display apparatus of claim 15, wherein each component of the plurality of components defines a transparent substrate.

19. The display apparatus of claim 15, the frame having
a width extending from a first one of the substantially planar internal sides to a second one of the substantially planar internal sides substantially parallel to the first one of the substantially planar internal sides, and
a length substantially perpendicular to the width, the length extending from a third one of the substantially planar internal sides to a fourth one of the substantially planar internal sides substantially parallel to the third one of the substantially planar internal sides, the width being less than the length,
wherein, for a first display component and a second display component of the plurality of display components, the first display component is laterally offset in the frame along the width and relative to the second display component such that a first central axis of the first display component extending substantially perpendicular to the second top surface is spaced from a second central axis of the second display component extending substantially perpendicular to the second top surface.

20. The display apparatus of claim 19, wherein the offset defines a portion of the space between the at least one of the substantially planar internal sides of the frame and the at least one display component of the plurality of display components and wherein the bonding substance fills the portion of the space.

* * * * *